(12) United States Patent
Miyazaki (10) Patent No.: US 11,358,415 B2
(45) Date of Patent: Jun. 14, 2022

(54) PNEUMATIC TIRE

(71) Applicant: Toyo Tire Corporation, Itami (JP)

(72) Inventor: Tetsuji Miyazaki, Itami (JP)

(73) Assignee: TOYO TIRE CORPORATION, Itami (JP)

(*) Notice: Subject to any disclaimer, the term of this patent is extended or adjusted under 35 U.S.C. 154(b) by 435 days.

(21) Appl. No.: 16/420,807

(22) Filed: May 23, 2019

(65) Prior Publication Data

US 2019/0375242 A1 Dec. 12, 2019

(30) Foreign Application Priority Data

Jun. 6, 2018 (JP) .............................. JP2018-108535

(51) Int. Cl.
*B60C 11/12* (2006.01)
*B60C 11/03* (2006.01)

(52) U.S. Cl.
CPC ...... *B60C 11/0304* (2013.01); *B60C 11/1204* (2013.01); *B60C 11/1236* (2013.01);
(Continued)

(58) Field of Classification Search
CPC . B60C 11/12; B60C 11/1204; B60C 11/1236; B60C 11/1272; B60C 11/0304;
(Continued)

(56) References Cited

U.S. PATENT DOCUMENTS

2006/0207702 A1 9/2006 Miyazaki
2016/0082780 A1 3/2016 Nagahara et al.
(Continued)

FOREIGN PATENT DOCUMENTS

CN 104417281 A 3/2015
EP 1 937 496 B1 6/2016
(Continued)

OTHER PUBLICATIONS

Office Action dated Apr. 20, 2021, issued in counterpart CN application No. 201910430687.5, with English translation. (17 pages).

(Continued)

*Primary Examiner* — Steven D Maki
*Assistant Examiner* — Philip N Schwartz
(74) *Attorney, Agent, or Firm* — Westerman, Hattori, Daniels & Adrian, LLP (57) ABSTRACT

A pneumatic tire includes the plurality of sipes, when, with regard to each sipe in which the shoulder-side end portion is located closest to a center side among the plurality of sipes, a position of the shoulder-side end portion of the sipe in the tire width direction is taken as a first reference position, and with regard to each sipe in which the center-side end portion is located closest to a shoulder side among the plurality of sipes, a position of the center-side end portion of the sipe in the tire width direction is taken as a second reference position, the plurality of sipes are arranged at regular intervals in the tire circumferential direction, and at other of the first reference position and the second reference position, the plurality of sipes are arranged at irregular intervals in the tire circumferential direction.

19 Claims, 4 Drawing Sheets

(52) U.S. Cl.
CPC ..... *B60C 11/1272* (2013.01); *B60C 2011/039* (2013.01); *B60C 2011/1209* (2013.01); *B60C 2011/1227* (2013.01); *B60C 2011/1254* (2013.01); *B60C 2011/1286* (2013.01)

(58) Field of Classification Search
CPC ..... B60C 2011/1227; B60C 2011/1286; B60C 2011/1209; B60C 2011/1254; B60C 2011/039
See application file for complete search history.

(56) References Cited

U.S. PATENT DOCUMENTS

2018/0134094 A1      5/2018   Muhlhoff et al.
2019/0308461 A1*   10/2019   Osawa ................ B60C 11/0306

FOREIGN PATENT DOCUMENTS

| | | |
|---|---|---|
| JP | 11-334321 A | 12/1999 |
| JP | 2001-219718 A | 8/2001 |
| JP | 3906967 B2 * | 4/2007 ............. B60C 11/12 |
| JP | 2013-78984 A | 5/2013 |
| JP | 2013-151289 A | 8/2013 |
| JP | 2016-064726 A | 4/2016 |
| JP | 2016-199118 A | 12/2016 |
| WO | 2016/177975 A1 | 11/2016 |

OTHER PUBLICATIONS

Office Action dated Mar. 11, 2022, issued in counterpart JP application No. 2018-108535, with English translation. (5 pages).

* cited by examiner

PNEUMATIC TIRE

BACKGROUND OF THE INVENTION

Field of the Invention

The present invention relates to a pneumatic tire including a tread portion.

Description of the Related Art

Heretofore, in a pneumatic tire, there is one in which a large number of cuts called sipes are formed on a rib defined by main grooves extending in a tire circumferential direction. The large number of sipes are formed on the rib, whereby an edge effect and a dehydration effect are improved, and running performance on an icy and snowy road surface, a wet road surface and the like can be improved. For example. Patent Documents 1 to 3 mentioned below describe pneumatic tires, each including a rib on which a plurality of sipes are arranged in a tire circumferential direction at regular intervals.

However, in the case where the sipes are arranged in the tire circumferential direction at regular intervals on the rib defined by the main grooves, regions sandwiched by the main grooves and the sipes form pseudo blocks (hereinafter, referred to as "pseudo blocks"), and the respective pseudo blocks become equal to one another in size and shape. Accordingly, there is a problem that a high-frequency impact sound called a pitch noise gets louder at the time when the pseudo blocks are grounded.

PRIOR ART DOCUMENTS

Patent Documents

Patent Document 1: WO2016/177975A1
Patent Document 2: EP1937496B1
Patent Document 3: JP-A-11-334321

SUMMARY OF THE INVENTION

The present invention has been invented in consideration of such a problem as mentioned above. It is an object of the present invention to provide a pneumatic tire in which noise performance is improved by dispersing a pitch noise.

In the present invention, the following pneumatic tire has been invented in order to achieve the above-described object.

That is, a pneumatic tire comprising a tread portion, wherein the tread portion includes a plurality of main grooves extending in a tire circumferential direction and a plurality of land portions defined by the main grooves, at least one of the pluralities of land portions is formed of a rib on which a plurality of sipes are provided at intervals in the tire circumferential direction, the plurality of sipes include plural types of sipes different in length of a tire width direction, and each of the sipes includes a shoulder-side end portion and a center-side end portion, and when, with regard to each sipe in which the shoulder-side end portion is located closest to a center side among the plurality of sipes, a position of the shoulder-side end portion of the sipe in the tire width direction is taken as a first reference position, and with regard to each sipe in which the center-side end portion is located closest to a shoulder side among the plurality of sipes, a position of the center-side end portion of the sipe in the tire width direction is taken as a second reference position, at one of the first reference position and the second reference position, the plurality of sipes are arranged at regular intervals in the tire circumferential direction, and at other of the first reference position and the second reference position, the plurality of sipes are arranged at irregular intervals in the tire circumferential direction.

In accordance with such a configuration, a sipe interval in the tire circumferential direction differs between the end portion on the side on which the sipes are arranged at regular intervals and the end portion on the side on which the sipes are arranged at irregular intervals. As a result, grounding timing of the pseudo blocks differs depending on the tire width direction, whereby noise performance can be improved by dispersing a pitch noise. Moreover, the sipes include the plural types of sipes different in length in the tire width direction, whereby an effect of dispersing the pitch noise can be appropriately exerted.

In the above, "shoulder side" refers to an outside in the tire width direction, and "center side" refers to an inside in the tire width direction. Moreover, the sipes refer to those in which a cutting width is 2 mm or less, preferably, 1.6 mm or less. In this specification, the fact that the plurality of sipes are arranged at regular intervals in the tire circumferential direction represents that a difference between the sipe intervals in the tire circumferential direction falls within 0.9 mm, and the fact that, the plurality of sipes are arranged at irregular intervals in the tire circumferential direction represents that the difference between the sipe intervals in the tire circumferential direction exceeds 0.9 mm.

It is preferable that in each of longest sipes having a longest length in the tire width direction among the plurality of sipes, one or both of the shoulder-side end portion and the center-side end portion are connected to the main groove. In this way, such dehydration performance by each of the longest sipes is improved, and in addition, it is facilitated to cause air in the longest sipe to escape to the main groove, whereby the occurrence of the pumping sound can be suppressed.

It is preferable that in each of shortest sipes having a shortest length in the tire width direction among the plurality of sipes, the shoulder-side end portion or the center-side end portion is connected to the main groove, and the longest sipe is connected to the main groove to which the shortest sipe is connected. In this way, such dehydration performance by each of the shortest sipes is further improved, and in addition, it is facilitated to cause air in the shortest sipe to escape to the main groove, whereby the occurrence of the pumping sound can be further suppressed.

It is preferable that when, at sipe end portions on a side on which both of the shortest sipes and the longest sipes are connected to the main groove, an angle of each of the shortest sipes with respect to the tire width direction is taken as a first angle, at the sipe end portions on the side on which both of the shortest sipes and the longest sipes are connected to the main groove, an angle of each of the longest sipes with respect to the tire width direction is taken as a second angle, and at sipe end portions opposite to the sipe end portions of the longest sipes, an angle of each of the longest sipes with respect to the tire width direction is taken as a third angle, then the third angle is larger than the first angle and the second angle. In this way, the sipe intervals in the tire circumferential direction can be effectively differentiated from one another, and the effect of dispersing the pitch noise can be appropriately exerted.

It is preferable that a mounting orientation to a vehicle is designated, and a number of the sipes connected to a main groove that faces a vehicle inside of the rib is larger than a number of the sipes connected to the main groove that faces a vehicle outside of the rib. In this way, rigidity in the vehicle inside of the rib is reduced, whereby a length of ground contact in the vehicle inside can be increased, and handling performance of the pneumatic tire can be improved.

It is preferable that the plurality of sipes are arranged at regular intervals in the tire circumferential direction at the first reference position, and the plurality of sipes are arranged at irregular intervals in the tire circumferential direction at the second reference position. In this way, a pitch noise generated on the center side of the pneumatic tire can be dispersed more intensively than on the shoulder side thereof.

It is preferable that among the plurality of sipes, longest sipes having a longest length in the tire width direction and shortest sipes having a shortest length in the tire width direction have sipe widths different from each other. By differentiating the sipe width of the longest sipes from the sipe width of the shortest sipes, the pitch noise can be further dispersed.

It is preferable that the plurality of land portions include a shoulder land portion located on an outermost side in the tire width direction, and a quarter land portion adjacent to a center side of the shoulder land portion while sandwiching the main groove therebetween and formed of the rib, and the shoulder land portion includes sipes connected to the main groove and lateral grooves which are not connected to the main groove, and the sipes and the lateral grooves on the shoulder land portion are individually located on virtual extension lines of sipes of the quarter land portion. In this way, with respect to the sipes and the lateral grooves, which are provided on the shoulder land portion, the sipes provided on the quarter land portion are arranged to be shifted therefrom in the tire circumferential direction, and accordingly, a dispersion effect of the pitch noise can be expected. Moreover, the lateral grooves wider than the sipes are not allowed to be connected to the main groove, whereby an excessive rigidity decrease of the shoulder land portion is prevented, and irregular wear thereof can be suppressed.

DETAILED DESCRIPTION OF THE PREFERRED EMBODIMENTS

Hereinafter, an embodiment in a pneumatic tire according to the present invention will be described with reference to the drawings. Note that, in the respective drawings, dimensional ratios in the drawings and actual dimensional ratios do not necessarily coincide with each other, and moreover, dimensional ratios between the respective drawings do not necessarily coincide with one another.

Figure 1:
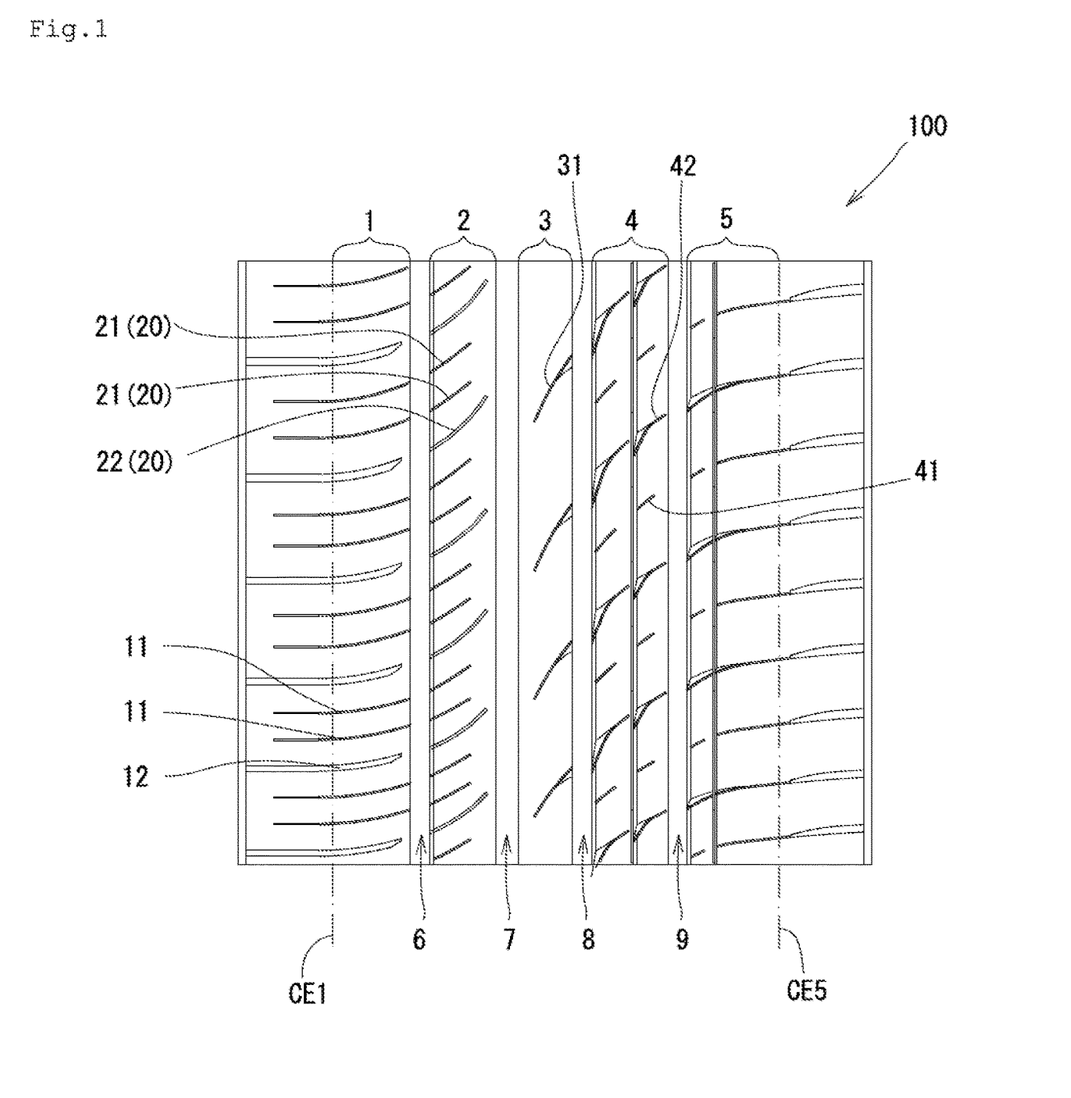
FIG. 1 is a development view illustrating an example of a tread surface of a pneumatic tire according to the present invention.

FIG. 1 is a plan view illustrating an embodiment of a tread portion 100 of the pneumatic tire according to the present invention. The tread portion 100 includes: four main grooves 6 to 9 extending in the tire circumferential direction; and five land portions 1 to 5 defined by the main grooves 6 to 9. The five land portions 1 to 5 are composed of a shoulder land portion 1, a quarter land portion 2, a center land portion 3, a quarter land portion 4 and a shoulder land portion 5. The shoulder land portions 1 and 5 are located on outermost sides of the tread portion 100 in a tire width direction, and are sandwiched by ground contact ends CE1 and CE5 and the main grooves 6 and 9. The quarter land portions 2 and 4 are adjacent to center sides of the shoulder land portions while sandwiching the main grooves 6 and 9 therebetween. The center land portion 3 is adjacent to center sides of the quarter land portions 2 and 4 while sandwiching the main grooves 7 and 8 therebetween. The respective land portions 1 to 5 are composed of ribs continuously extending in the tire circumferential direction, and on each of the ribs, a plurality of sipes are formed at intervals in the tire circumferential direction. It is not necessary that a direction where the main grooves extend be completely coincide with the tire circumferential direction. It is preferable that the number of main grooves be three or more, and that the number of land portions be four or more. In the case where the number of land portions is four, the center land portion is not provided.

The ground contact ends CE1 and CE5 are outermost positions of the tread portion 100 in the tire width direction when the tire assembled to a normal rim and applied with a normal internal pressure and a normal load is grounded to a flat road surface. The normal rim is a rim determined for each of tires by a standard on which the tires are based, the standard being included in a system of standards. For example, the normal rim is a reference rim defined by Japan Automobile Tyre Manufacturers Association (JATMA), "Design Rim" defined by The Tire and Rim Association, Inc. (TRA), or "Measuring Rim" defined by The European Tyre and Rim Technical Organization (ETRTO). The normal internal pressure is an air pressure defined for each of the tires by the standard on which the tires are based, the standard being included in the system of standards. For example, the normal internal pressure is a maximum air pressure defined by JATMA, a maximum value described in the table "TIRE LOAD LIMITS AT VARIOUS COLD INFLATION PRESSURES" in TRA, or "INFLATION PRESSURE" defined by ETRTO. The normal load is a load determined for each of the tires by the standard on which the tires are based, the standard being included in the system of standards. For example, the normal load is a maximum load capacity defined by JATMA, a maximum value described in the above table of TRA, or "LOAD CAPACITY" defined by ETRTO.

The quarter land portion 2 is formed of a rib on which a plurality of sipes 20 are provided at intervals in the tire circumferential direction. The plurality of sipes 20 include plural types of sipes different in length in the tire width direction, and in this embodiment, include two types of sipes 21 and 22. The plurality of sipes 20 individually extend along the tire width direction, and have shoulder-side end portions and center-side end portions.

Figure 2A:
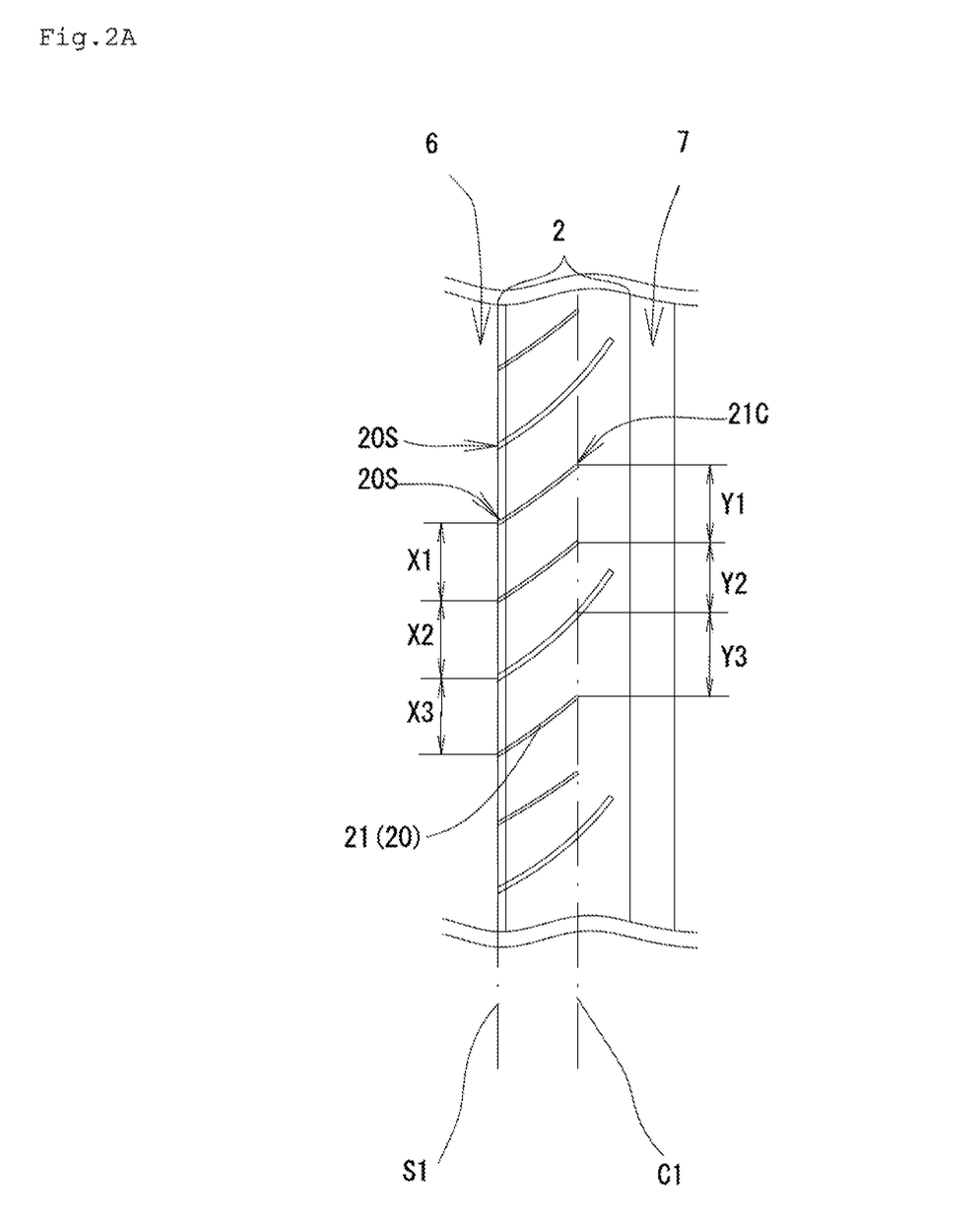
FIG. 2A is a plan view illustrating a quarter land portion and a peripheral region thereof in this embodiment.

FIG. 2A is an explanatory view of the quarter land portion 2 of this embodiment. A first reference position S1 will be described. The first reference position S1 is a position in the tire width direction of each shoulder-side end portion 20S of the sipe 20 in which the shoulder-side end portion is located closest to the center side among the plurality of sipes 20. In the case of this embodiment, the shoulder-side end portions of all the sipes are connected to the main groove 6. Accordingly, the first reference position S1 is positions in the tire width direction of intersections of the shoulder-side end portions 20S of all the sipes and the main groove 6. A second reference position C1 will be described. The second reference position C1 is a position in the tire width direction of each center-side end portion 21C of the sipe 21 in which the center-side end portion is located closest to the shoulder side among the plurality of sipes 20.

At one of the first reference position S1 and the second reference position C1 (the one is the first reference position S1 in this embodiment), the plurality of sipes 20 are arranged at regular intervals in the tire circumferential direction. That is, sipe intervals X1, X2 and X3 in the tire circumferential direction are substantially equal to one another, and a difference between these falls within 0.9 mm. Moreover, in the other of the first reference position S1 and the second reference position C1 (the other is the second reference position C1 in this embodiment), the plurality of sipes 20 are arranged at irregular intervals in the tire circumferential direction. That is, sipe intervals Y1, Y2 and Y3 in the tire circumferential direction are substantially different from one another, and a difference between these exceeds 0.9 mm.

In accordance with such a configuration, the sipe interval in the tire circumferential direction differs between the first reference position S1 and the second reference position C1. As a result, grounding timing of the pseudo blocks differs depending on the tire width direction, whereby noise performance can be improved by dispersing a pitch noise. Moreover, the sipes 20 include the plural types of sipes 21 and 22 different in length in the tire width direction, whereby an effect of dispersing the pitch noise can be appropriately exerted. Furthermore, the difference in length between the sipes 21 and the sipes 22 generates further differences in shape/dimension of the pseudo blocks, and accordingly, a further effect of dispersing the pitch noise is obtained. In this embodiment, at the first reference position S1, the sipes 20 are arranged at regular intervals in the tire circumferential direction, and at the second reference position C1, the sipes 20 are arranged at irregular intervals in the tire circumferential direction, whereby the pitch noise generated on the center side can be dispersed intensively.

Figure 2B:
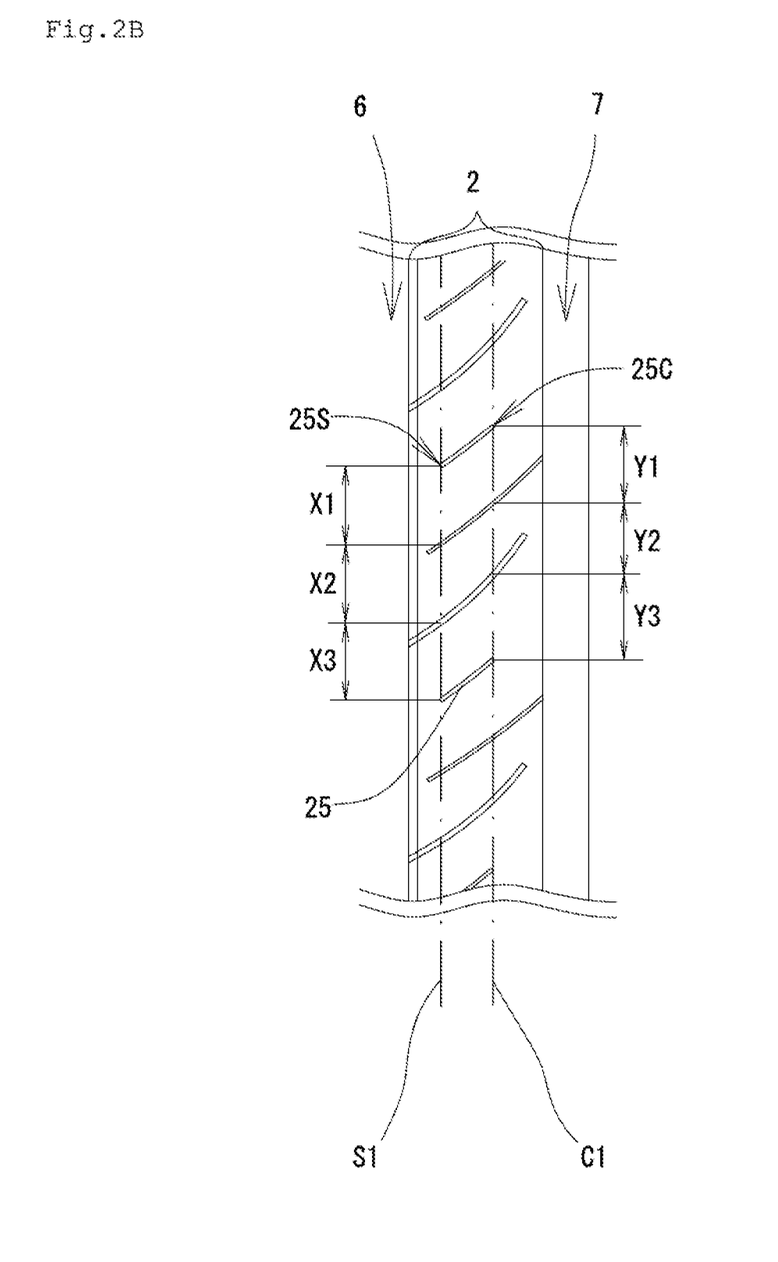
FIG. 2B is a plan view illustrating a quarter land portion and a peripheral region thereof in another embodiment.

In the above-described embodiment, the shoulder-side end portions of all the sipes 20 provided on the quarter land portion 2 are connected to the main groove 6; however, this is not an essential configuration. As another embodiment, FIG. 2B illustrates the case where, among the plurality of sipes 20 provided on the quarter land portion 2, the end portions of a part of the sipes are not connected to the main groove. In this case, both of the first reference position S1 and the second reference position C1 are located on the quarter land portion 2.

When the sipes are connected to the main groove, it becomes easy for water and air which flow into the sipes to escape to the main groove. Accordingly, in comparison with the case where the sipes are not connected to the main groove, there is obtained an effect of making it possible to suppress an occurrence of a pumping sound by improving dehydration performance. Moreover, there is also obtained an effect of increasing road holding properties of the pseudo blocks by reducing rigidity thereof. When the sipes are not connected to the main groove, then in comparison with the case where the sipes are connected to the main groove, there is obtained an effect of reducing so-called inter-sipe heel-and-toe wear by increasing the rigidity of the pseudo blocks. Hence, it just needs to be determined whether to connect the end portions of the sipes to the main groove depending on the effects to be exerted.

It is preferable that, in each of the longest sipes having the longest length in the tire width direction among the plurality of sipes 20, one or both of the shoulder-side end portion and the center-side end portion be connected to the main groove. In this embodiment, in the sipe 22 as the longest sipe, only the shoulder-side end portion is connected to the main groove 6. In this way, such dehydration performance by the longest sipe is improved, and in addition, it is facilitated to cause air in the longest sipe to escape to the main groove, whereby the occurrence of the pumping sound can be suppressed.

It is preferable that, in each of the shortest sipes having the shortest length in the tire width direction among the plurality of sipes 20, one of the shoulder-side end portion and the center-side end portion be connected to the main groove. In this embodiment, in the sipe 21 as the shortest sipe, only the shoulder-side end portion is connected to the main groove 6. In this way, such dehydration performance by the shortest sipe is further improved, and in addition, it is facilitated to cause air in the shortest sipe to escape to the main groove, whereby the occurrence of the pumping sound can be further suppressed.

In this embodiment, two types of sipes which are the short sipes 21 and the long sipes 22 are provided as the sipes different in length in the tire width direction from each other; however, without being limited to this, three types or more of sipes different in length from one another may be provided. Moreover, in this embodiment, the short sipes 21 and the combinations of the short sipes 21 and the long sipes 22 are repeatedly arranged in the tire circumferential direction; however, sipes may be arranged randomly.

Figure 3:
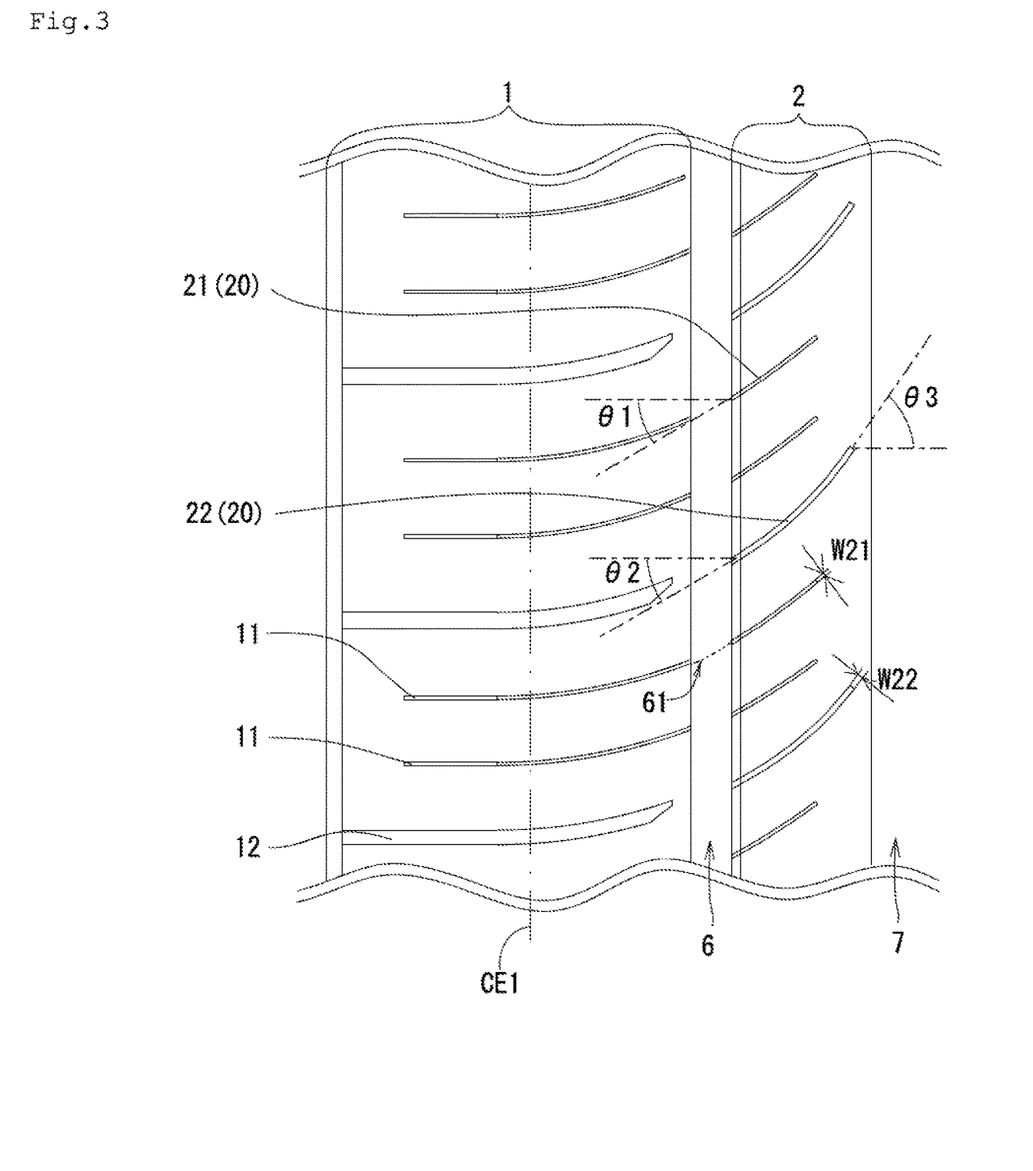
FIG. 3 is a plan view illustrating a shoulder land portion, a quarter land portion and a peripheral region thereof in this embodiment.

FIG. 3 illustrates inclinations at the end portions of the sipe 21 and the sipe 22 in the quarter land portion 2 illustrated in FIG. 2A. At sipe end portions on the side (that is, the shoulder side) on which both of the sipes 21 as the shortest sipes and the sipes 22 as the longest sipes are connected to the main groove, an angle of each of the sipes 21 with respect to the tire width direction is taken as a first angle $\theta 1$, and an angle of each of the sipes 22 with respect to the tire width direction is taken as a second angle $\theta 2$. Then, at sipe end portions (that is, center-side sipe end portions) opposite to the sipe end portions (that is, the shoulder-side sipe end portions) of the sipe 22, an angle of each of the sipes 22 with respect to the tire width direction is taken as a third angle $\theta 3$. In this embodiment, the sipes 22 are curved so that the third angle $\theta 3$ becomes larger than the first angle $\theta 1$ and the second angle $\theta 2$. Therefore, the sipe intervals in the tire circumferential direction are effectively differentiated from one another, and the effect of dispersing the pitch noise can be appropriately exerted. Moreover, the first angle $\theta 1$ and the second angle $\theta 2$ may be angles equal to each other.

Herein, it is preferable that each of the first angle $\theta 1$ and the second angle $\theta 2$ be 30 degrees or less. When the first angle $\theta 1$ or the second angle $\theta 2$ is large, rigidity of the rib decreases in an acute angle portion made of the sipe and the main groove in comparison with other regions, and the acute angle portion is worn earlier than the other portions, whereby the so-called inter-sipe heel-and-toe wear becomes likely to occur. However, when the first angle $\theta 1$ and the second angle $\theta 2$ are equal to or less than 30 degrees, the rigidity of the rib is suppressed from decreasing, and the inter-sipe heel-and-toe wear can be suppressed from occurring. Moreover, it is preferable that the third angle θ3 be 45 degrees or more. In this way, the first angle θ1 and the second angle θ2 are given a sufficient angle difference from the third angle θ3, whereby the pitch noise can be dispersed sufficiently.

In this embodiment, a mounting orientation of the pneumatic tire to a vehicle is designated, and in addition to this, this embodiment is provided with a configuration in which the number of sipes 20 connected to the main groove 6 that faces a vehicle inside of the rib that is the quarter land portion 2 is larger than the number of sipes 20 connected to the main groove 7 that faces a vehicle outside of the rib. In this way, rigidity in the vehicle inside of the rib is reduced, whereby a length of ground contact in the vehicle inside where the road holding properties are prone to decrease in comparison with the vehicle outside can be increased, and there is obtained an advantageous effect of improving handling performance of the pneumatic tire. However, the pneumatic tire of the present invention is not limited to the one in which the mounting orientation to the vehicle is designated.

A display to designate the mounting orientation to the vehicle is provided, for example, on a sidewall portion. Specifically, it is conceivable to provide a display (for example, OUTSIDE), which tells that the sidewall portion disposed on the vehicle outside when the pneumatic tire is mounted on the vehicle shall face the vehicle outside, on an outer surface of the sidewall portion. Alternatively or additionally, it is conceivable to provide a display (for example, INSIDE), which tells that the sidewall portion disposed on the vehicle inside when the pneumatic tire is mounted on the vehicle shall face the vehicle inside, on the outer surface of the sidewall portion.

Moreover, the sipes 21 as the shortest sipes and the sipes 22 as the longest sipes have different sipe widths from each other. By differentiating the sipe width of the longest sipes from the sipe width of the shortest sipes, the pitch noise can be further dispersed. In this embodiment, the sipes 22 as the longest sipes are formed wider than the sipes 21 as the shortest sipes, whereby the pitch noise can be dispersed more effectively. A width W22 of the sipes 22 is, for example, 1.3 times or more a width W21 of the sipes 21.

In this embodiment, the shoulder land portion 1 includes sipes 11 and lateral grooves 12, and the sipes 11 and the lateral grooves 12 are located on virtual extension lines 61 of the sipes 21 and 22 of the quarter land portion 2, which are adjacent thereto while sandwiching the main groove 6 therebetween. The sipes located in such a positional relationship are arranged to be shifted from each other in the tire circumferential direction between the center side and shoulder side of the main groove 6, and accordingly, the pitch noise is dispersed. Moreover, an exterior appearance in which the sipes are continuous with each other while sandwiching the main groove 6 therebetween is formed, and accordingly, an excellent design is also achieved. Herein, the virtual extension lines of the sipes can be determined by taking width centers of the sipes as references. Then, even if the sipes 11 and lateral grooves 12 of the shoulder land portion 1 do not completely coincide with the virtual extension lines 61 of the sipes 21 and 22 of the quarter land portion 2, respectively, it is recognized that the sipes 11 and lateral grooves 12 of the shoulder land portion 1 are individually located on the virtual extension lines of the sipes of the quarter land portion 2 if the sipes 11 and the lateral grooves 12 are close to the virtual extension lines 61, for example, if a distance therebetween in the tire circumferential direction falls within 3 mm. Moreover, the lateral grooves 12 refer to those in which a groove width exceeds 2 mm.

In this embodiment, the lateral grooves 12 of the shoulder land portion 1 are not connected to the main groove 6. This is because the lateral grooves 12 are wider than the sipes and are more likely to cause the rigidity decrease of the rib than the sipes. The lateral grooves 12 are not allowed to be connected to the main groove 6, whereby an excessive rigidity decrease of the shoulder land portion 1 is prevented, and the wear of the shoulder can be suppressed.

In the above-described embodiment, the arrangement of the sipes on the quarter land portion 2 are mainly described as an example; however, similar sipes to those on the quarter land portion 2 may also be arranged on the shoulder land portion 1, the center land portion 3, the quarter land portion 4 or the shoulder land portion 5. However, in comparison with the application of the sipes to the shoulder land portions 1 and 5 and the center land portion 3, in the application of the sipes to the quarter land portions 2 and 4 in the above-described embodiment, the above-mentioned effects including the pitch noise dispersion effect are suitably obtained with a good balance.

The pneumatic tire according to the present invention can be composed similarly to usual pneumatic tires except that the tread portion is composed as described above, and any of a material, a shape, a structure and a manufacturing method, which are conventionally known, can be adopted. Though not illustrated, the pneumatic tire of this embodiment includes: a pair of bead portions; sidewall portions, each of which extends outside in the tire diameter direction from each of the bead portions; and a tread portion continuous with outside ends in the tire diameter direction of the respective sidewall portions.

The present invention is not limited to the above-mentioned embodiments, and is improvable and modifiable in various ways within the scope without departing from the spirit of the present invention.

What is claimed is:
1. A pneumatic tire comprising a tread portion,
   wherein the tread portion includes a plurality of main grooves extending in a tire circumferential direction and a plurality of land portions defined by the main grooves,
   at least one of the pluralities of land portions is formed of a rib on which a plurality of sipes are provided at intervals in the tire circumferential direction,
   the plurality of sipes include plural types of sipes different in length of a tire width direction, and each of the sipes includes a shoulder-side end portion and a center-side end portion, and
   when, with regard to each sipe in which the shoulder-side end portion is located closest to a center side among the plurality of sipes, a position of the shoulder-side end portion of the sipe in the tire width direction is taken as a first reference position, and with regard to each sipe in which the center-side end portion is located closest to a shoulder side among the plurality of sipes, a position of the center-side end portion of the sipe in the tire width direction is taken as a second reference position,
   at one of the first reference position and the second reference position, the plurality of sipes are arranged at regular intervals in the tire circumferential direction, and at other of the first reference position and the second reference position, the plurality of sipes are arranged at irregular intervals in the tire circumferential direction, wherein, among the plurality of sipes, longest sipes having a longest length in the tire width direction and shortest sipes having a shortest length in the tire width direction have sipe widths different from each other.

2. The pneumatic tire according to claim 1, wherein, in each of longest sipes having a longest length in the tire width direction among the plurality of sipes, one or both of the shoulder-side end portion and the center-side end portion are connected to a main of groove of the plurality of the main groove.

3. The pneumatic tire according to claim 2, wherein,
in each of shortest sipes having a shortest length in the tire width direction among the plurality of sipes, the shoulder-side end portion or the center-side end portion is connected to a main of groove of the plurality of the main groove, and
the longest sipe is connected to the main of groove to which the shortest sipe is connected.

4. The pneumatic tire according to claim 3, wherein,
when, at sipe end portions on a side on which both of the shortest sipes and the longest sipes are connected to a main of groove of the plurality of the main groove, an angle of each of the shortest sipes with respect to the tire width direction is taken as a first angle,
at the sipe end portions on the side on which both of the shortest sipes and the longest sipes are connected to the main of groove, an angle of each of the longest sipes with respect to the tire width direction is taken as a second angle, and
at sipe end portions opposite to the sipe end portions of the longest sipes, an angle of each of the longest sipes with respect to the tire width direction is taken as a third angle,
then the third angle is larger than the first angle and the second angle.

5. The pneumatic tire according to claim 4, wherein the first angle and the second angle are angles equal to each other.

6. The pneumatic tire according to claim 4, wherein each of the first angle and the second angle is 30 degrees or less, and the third angle is 45 degrees or more.

7. The pneumatic tire according to claim 1,
wherein a mounting orientation to a vehicle is designated, and
a number of the sipes connected to a main groove that faces a vehicle inside of the rib is larger than a number of the sipes connected to the main groove that faces a vehicle outside of the rib.

8. The pneumatic tire according to claim 1, wherein the plurality of sipes are arranged at regular intervals in the tire circumferential direction at the first reference position, and the plurality of sipes are arranged at irregular intervals in the tire circumferential direction at the second reference position.

9. The pneumatic tire according to claim 1, wherein the sipe width of the longest sipes is 1.3 times or more the sipe width of the shortest sipes.

10. The pneumatic tire according to claim 1, wherein
the plurality of land portions include a shoulder land portion located on an outermost side in the tire width direction, and a quarter land portion adjacent to a center side of the shoulder land portion while sandwiching the main groove therebetween and formed of the rib, and the shoulder land portion includes sipes connected to the main groove and lateral grooves which are not connected to the main groove, and the sipes and the lateral grooves on the shoulder land portion are individually located on virtual extension lines of sipes of the quarter land portion.

11. The pneumatic tire according to claim 1, wherein, in all sipes which constitute the plurality of sipes, the shoulder-side end portions are connected to a main of groove of the plurality of the main groove.

12. The pneumatic tire according to claim 1, wherein, among the plurality of sipes, end portions of a part of the sipes are not connected to a main of groove of the plurality of the main groove.

13. The pneumatic tire according to claim 1, wherein the plural types of sipes are composed of two types of sipes.

14. The pneumatic tire according to claim 1, wherein combinations of the plural types of sipes are repeatedly arranged in the tire circumferential direction.

15. The pneumatic tire according to claim 1, wherein the plural types of sipes are randomly arranged in the tire circumferential direction.

16. A pneumatic tire comprising a tread portion,
wherein the tread portion includes a plurality of main grooves extending in a tire circumferential direction and a plurality of land portions defined by the main grooves,
at least one of the pluralities of land portions is formed of a rib on which a plurality of sipes are provided at intervals in the tire circumferential direction,
the plurality of sipes include plural types of sipes different in length of a tire width direction, and each of the sipes includes a shoulder-side end portion and a center-side end portion, and
when, with regard to each sipe in which the shoulder-side end portion is located closest to a center side among the plurality of sipes, a position of the shoulder-side end portion of the sipe in the tire width direction is taken as a first reference position, and with regard to each sipe in which the center-side end portion is located closest to a shoulder side among the plurality of sipes, a position of the center-side end portion of the sipe in the tire width direction is taken as a second reference position,
at one of the first reference position and the second reference position, the plurality of sipes are arranged at regular intervals in the tire circumferential direction, and at other of the first reference position and the second reference position, the plurality of sipes are arranged at irregular intervals in the tire circumferential direction,
wherein the plurality of land portions include a shoulder land portion located on an outermost side in the tire width direction, and a quarter land portion adjacent to a center side of the shoulder land portion while sandwiching the main groove therebetween and formed of the rib, and
the shoulder land portion includes sipes connected to the main groove and lateral grooves which are not connected to the main groove, and the sipes and the lateral grooves on the shoulder land portion are individually located on virtual extension lines of sipes of the quarter land portion.

17. The pneumatic tire according to claim 16, wherein, in each of longest sipes having a longest length in the tire width direction among the plurality of sipes, one or both of the shoulder-side end portion and the center-side end portion are connected to a main of groove of the plurality of the main groove.

18. The pneumatic tire according to claim 17, wherein,
in each of shortest sipes having a shortest length in the tire width direction among the plurality of sipes, the shoulder-side end portion or the center-side end portion is connected to a main of groove of the plurality of the main groove, and
the longest sipe is connected to the main of groove to which the shortest sipe is connected.

19. The pneumatic tire according to claim 18, wherein,
when, at sipe end portions on a side on which both of the shortest sipes and the longest sipes are connected to a main of groove of the plurality of the main groove, an angle of each of the shortest sipes with respect to the tire width direction is taken as a first angle,
at the sipe end portions on the side on which both of the shortest sipes and the longest sipes are connected to the main of groove, an angle of each of the longest sipes with respect to the tire width direction is taken as a second angle, and
at sipe end portions opposite to the sipe end portions of the longest sipes, an angle of each of the longest sipes with respect to the tire width direction is taken as a third angle,
then the third angle is larger than the first angle and the second angle.

* * * * *